US007307755B2

(12) United States Patent
Delang et al.

(10) Patent No.: US 7,307,755 B2
(45) Date of Patent: Dec. 11, 2007

(54) METHOD FOR CORRECTING UNADJUSTED PRINTING DATA ON THE BASIS OF COLORMETRICALLY MEASURED REFERENCE SHEET

(75) Inventors: Ulf Delang, Walldorf (DE); Friedrich Heuss, Pfungstadt (DE); Martin Mayer, Ladenburg (DE); Manfred Schneider, Bad Rappenau (DE); Helmut Siegeritz, Kronshagen (DE); Bernd Utter, Schriesheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 904 days.

(21) Appl. No.: 10/752,269

(22) Filed: Jan. 6, 2004

(65) Prior Publication Data
US 2004/0150848 A1 Aug. 5, 2004

(30) Foreign Application Priority Data
Jan. 21, 2003 (DE) .................. 103 02 092

(51) Int. Cl.
*H04N 1/60* (2006.01)
(52) U.S. Cl. .................. 358/1.9; 358/504; 358/518
(58) Field of Classification Search .............. 358/1.9, 358/504, 518–523, 527, 530; 382/162, 167
See application file for complete search history.

(56) References Cited

U.S. PATENT DOCUMENTS

| 5,271,096 | A | | 12/1993 | Cook | 358/1.9 |
|---|---|---|---|---|---|
| 5,481,380 | A | | 1/1996 | Bestmann | 358/504 |
| 5,668,890 | A | | 9/1997 | Winkelmann | 382/167 |
| 5,760,913 | A | | 6/1998 | Falk | 358/504 |
| 6,320,668 | B1 | * | 11/2001 | Kim | 358/504 |
| 6,324,975 | B1 | * | 12/2001 | Kondo | 101/171 |
| 6,580,524 | B1 | | 6/2003 | Weichmann et al. | 358/1.9 |
| 6,891,649 | B1 | * | 5/2005 | Kondo | 358/1.9 |
| 7,009,732 | B2 | * | 3/2006 | Mayer et al. | 358/1.9 |
| 7,206,094 | B2 | * | 4/2007 | Kumada et al. | 358/1.16 |
| 7,233,412 | B2 | * | 6/2007 | Siegeritz | 358/1.9 |
| 2001/0013940 | A1 | | 8/2001 | Mayer et al. | 358/1.9 |
| 2001/0028471 | A1 | * | 10/2001 | Hirokazu | 358/1.13 |
| 2003/0123072 | A1 | * | 7/2003 | Spronk | 358/1.9 |
| 2003/0151757 | A1 | * | 8/2003 | Bestmann et al. | 358/1.9 |
| 2004/0184658 | A1 | * | 9/2004 | Inoue | 358/1.9 |
| 2005/0094170 | A1 | * | 5/2005 | Ichitani | 358/1.9 |

FOREIGN PATENT DOCUMENTS

| DE | 4310727 | 10/1993 |
|---|---|---|
| DE | 19844495 | 4/2000 |
| DE | 10056723 | 6/2001 |

* cited by examiner

Primary Examiner—Scott A. Rogers
(74) Attorney, Agent, or Firm—Davidson, Davidson & Kappel, LLC

(57) ABSTRACT

A method for correcting digitized image data in the prepress stage when using printing presses having a device-independent color profile in the main printing stage, having the following method steps:
colorimetric measurement of a reference sheet and production of an image file in a device-independent color space,
conversion of an image file belonging to the reference sheet in a device-dependent color space into a further image file in a device-independent color space using the device-independent color profile belonging to the printing press to be used,
comparison of the two device-independent image files.
performing alterations on the device-dependent image file associated with the reference sheet or alteration of the printing process in the selected printing press if tolerance limits are exceeded.

11 Claims, 2 Drawing Sheets

| pixel | hue value | | | |
|---|---|---|---|---|
| | C | M | Y | K |
| 1 | 10 | 10 | 10 | 0 |
| 2 | 20 | 20 | 20 | 0 |
| 3 | 30 | 30 | 30 | 0 |
| 4 | 40 | 40 | 40 | 0 |

Fig.2

| pixel | standard color value | | | hue value | | | | Lab value | | | color value | | |
|---|---|---|---|---|---|---|---|---|---|---|---|---|---|
| | X | Y | Z | C | M | Y | K | L* | a* | b* | X* | Y* | Z* |
| 1 | 62,7 | 64,0 | 49,8 | 10 | 10 | 10 | 0 | 84,0 | 2,2 | 3,4 | 0,87 | 0,86 | 0,84 |
| 2 | 47,7 | 48,2 | 36,8 | 20 | 20 | 20 | 0 | 75,0 | 3,4 | 4,0 | 0,79 | 0,78 | 0,76 |
| 3 | 36,9 | 36,9 | 27,8 | 30 | 30 | 30 | 0 | 67,2 | 4,4 | 4,4 | 0,73 | 0,72 | 0,70 |
| 4 | 28,0 | 27,7 | 20,4 | 40 | 40 | 40 | 0 | 59,6 | 5,1 | 4,8 | 0,66 | 0,65 | 0,63 |
| average | 43,8 | 44,2 | 33,7 | 25 | 25 | 25 | 0,0 | 72,4 | 3,5 | 4,0 | 0,77 | 0,76 | 0,74 |

Fig.3

| Pixel | standard color value | | | hue value | | | | Lab value | | | color value | | |
|---|---|---|---|---|---|---|---|---|---|---|---|---|---|
| | X | Y | Z | C | M | Y | K | L* | a* | b* | X* | Y* | Z* |
| 1 | 47,7 | 48,2 | 36,8 | 20 | 20 | 20 | 0 | 75,0 | 3,4 | 4,0 | 0,79 | 0,78 | 0,76 |
| 2 | 36,9 | 36,9 | 27,8 | 30 | 30 | 30 | 0 | 67,2 | 4,4 | 4,4 | 0,73 | 0,72 | 0,70 |
| 3 | 28,0 | 27,7 | 20,4 | 40 | 40 | 40 | 0 | 59,6 | 5,1 | 4,8 | 0,66 | 0,65 | 0,63 |
| 4 | 21,4 | 21,0 | 15,2 | 50 | 50 | 50 | 0 | 52,9 | 5,3 | 5,0 | 0,60 | 0,59 | 0,57 |
| average | 33,5 | 33,5 | 25,1 | 35,0 | 35,0 | 35,0 | 0,0 | 64,5 | 4,3 | 4,4 | 0,70 | 0,69 | 0,67 |

Fig.4

METHOD FOR CORRECTING UNADJUSTED PRINTING DATA ON THE BASIS OF COLORMETRICALLY MEASURED REFERENCE SHEET

This claims priority to German Patent Application No. 103 02 092.6, filed Jan. 21, 2003 and hereby incorporated by reference herein.

BACKGROUND INFORMATION

The present invention relates to a method for correcting digitized image files in the prepress stage when using printing presses having a device-independent color profile in the main printing stage.

Basically, a printing process is divided into three fields: prepress stage, main printing stage, and print finishing. The first two fields are primarily of interest for the present invention, all work steps before the actual printing being included in the prepress stage. These include, for example, the typesetting, i.e., the text acquisition, the text formatting, and the text make-up, the reproduction of artwork and graphics, and the paste-up and printing form production. Up to the transfer onto the printing form(s), the prepress work processes are frequently implemented currently as digitized work processes (digital workflow). The digital data is then applied directly to the printing form in the printing press using a plate imager or, in offset printing presses, using DI technology. The finished printed products of the printing press are to correspond as exactly as possible to the expectations of the client in this case, these client expectations often manifesting themselves in a reference sheet. This means that the data of the prepress stage is to be constituted in such a way that when it has been written on the printing form and the printing press operates using this printing form, printed products of the press are to be as similar as possible to the reference sheets.

Many approaches to achieve this object are known from the related art. Such a method arises from German Patent Application No. 100 56 723 A1, which allows a reference sheet to be compared with the associated printed products of multiple printing presses and the printing presses to be controlled in such a way that they largely provide identical printed products. For this purpose, a reference sheet is scanned in and saved in a standardized color space, e.g., a Lab color space or an RGB color space, in a device-independent representation. This device-independent data is then converted into a CMYK color space suitable for printing presses, and a sample print is then executed on each of the printing presses. The sample prints are scanned in turn, saved in a standardized color space, and compared to the device-independent data of the scanned reference sheet. If deviations arise in this case, these deviations are converted into the CMYK color space in the standardized color space and the non-standardized CMYK data is thus corrected. This correction is performed separately for each printing press, so that finally a transformation step is developed for each printing press which ensures that the printed products on the different printing presses have the appearance of the reference sheet.

The method described has the disadvantage that it is dependent on sample prints and thus produces waste, since, for an informative sample print, a specific number of sheets must be printed until the state of a printing press has stabilized.

BRIEF SUMMARY OF THE INVENTION

An object of the present invention is to perform a correction through colorimetric measurement of a reference sheet and analysis of all data then existing in such a way that the colors of the printing result are to be as similar as possible to the reference sheet, with unnecessary waste for sample prints to be avoided.

The present invention provides a method for correcting digitized image data in the prepress stage when using printing presses having a device-independent color profile in the main printing stage, having the following method steps:

colorimetric measurement of a reference sheet and production of an image file in a device-independent color space;

conversion of an image file belonging to the reference sheet in a device-dependent color space into a further image file in a device-independent color space using the device-independent color profile belonging to the printing press to be used;

comparison of the two device-independent image files;

performing alterations on the device-dependent image file associated with the reference sheet or alteration of the printing process in the selected printing press if tolerance limits are exceeded.

Using the method according to the present invention, it is possible to dispense with sample prints and therefore waste. In this case, the starting point for the achievement of the object is a printing press which uses a device-independent color profile. Such a device-independent color profile has the advantage that device-specific properties exist in the color reproduction in a standardized color profile, so that the color reproduction is the same on any device which uses such a standardized color profile, whether it is a printing press, an input device, or even a monitor for displaying image data. Therefore, in the method according to the present invention, a reference sheet of a client is first measured colorimetrically, e.g., using an appropriate scanner and measuring device such as Image Control from Heidelberg, and a digital image file is saved in a device-independent color space from the measurement results. The image file is uniquely saved in such a device-independent standardized color space, due to which it represents a unique reference point. Besides the reference sheet of the client, there is a further image file from the digitized prepress stage, which, however, typically exists in a device-independent color space. The way in which the image data has been generated may not always be reconstructed, so that it is not possible to use the image file in the device-dependent color space directly for printing, since significant deviations would then be expected in the printed products in relation to the reference sheet. For this reason, the image file existing in a device-dependent color space is first converted into a device-independent color space, this advisably being the same device-independent color space in which the colorimetrically measured reference sheet also exists. These two image files existing in a device-independent color space may be compared to one another to establish deviations between the two image files. If the deviations do not lie within a preset tolerance limit, the image data of the device-dependent image files must be corrected correspondingly, or changes must be performed in the printing process of the printing press involved. The tolerance limit is advisably set so that deviations within the tolerance limits would not be recognizable by an untrained observer using the naked eye.

A first advantageous embodiment of the present invention is that consumable materials used in the selected printing press, in particular ink or paper, are changed to alter the printing process. The image file existing in a device-dependent color space and the consumable materials may be directly correlated via the standardized device-independent color profile of the printing press. In this way, it is possible to calculate beforehand how the output of the image files belonging to the reference sheet changes if the consumable materials are changed. Via the standardized color profile, the effect of the change in the consumable materials on the image file belonging to the reference sheet, which has been converted into a device-independent color space using the device-independent color profile of the printing press may be predicted. If the device-independent image file thus corrected now corresponds within the tolerance limits to the image file of the measured reference sheet, the alteration of the consumable materials is sufficient for conforming to the color reproduction. Since printing inks and printing paper are usually precisely classified and their essential data is therefore known, the effect of the consumable materials may be predicted without problems.

Furthermore, the device-independent color profile of the printing press may be an ICC profile. ICC stands for International Color Consortium, an organization which has set as its goal the provision of a standard for device-independent uniform color reproduction. The ICC standard is the standard most used for device-independent color profiles worldwide and is therefore outstandingly suitable for performing the conversion from a device-dependent color space into a device-independent color space. Because of this fact, almost all printing presses which use a device-independent color profile operate using an ICC color profile.

In a further advantageous embodiment of the present invention, the reference sheet is colorimetrically measured at multiple points in a uniform raster using an automatic spectrophotometer. Spectrophotometers, such as the Image Control spectrophotometer cited above, represent a simple possibility for measuring the reference sheet colorimetrically and saving the measured data in a digital image file. In this case, individual pixels, which are basically applied in a raster for printing, are measured, it being possible to use all pixels or only specific pixels for measurement.

Furthermore, the device-independent image file may exist in the format of a Lab image file. The Lab color space is a device-independent color space in which color values are converted into equidistant values according to the present invention, L indicating the brightness, a the red-green component, and b the yellow-blue component.

In a further embodiment of the present invention, multiple pixels of the reference sheet are combined into a measured value during the colorimetric measurement and these values are compared to likewise combined further values of the device-independent image file. Since the orifice plate of the automatic spectrophotometer must have a specific size in order to capture sufficient light, a plurality of pixels of the reference sheet are always located under the measurement aperture. Therefore, it would only be possible with a very coarse rasterizing to measure each pixel individually. However, this is also not even desirable, since, through the simultaneous detection of multiple pixels, the influence of the rasterization on the color reproduction may be compensated for through averaging over multiple pixels. Since measured values established for the reference sheet thus exist, these values may also only be compared to such values of the further device-independent image file. For this reason, the image data of the further device-independent image file is also combined in pixel groups and average values are calculated therefrom, which may thus be compared to the average values of the measured reference sheet.

In addition, measured values obtained using the colorimetric measurement, which have a color distance lying above a fixed limit from the average values formed by the surrounding measured values, are advantageously sorted out. In this way, errors in the averaging due to very inhomogeneous image spots are avoided by performing a corresponding statistical analysis for each pixel group.

In a further embodiment of the present invention, if the tolerances are exceeded, correction values are calculated and a mapping specification for converting the two device-independent image files into one another is calculated therefrom. Through the comparison of the averaged measured values of the reference sheet to the average values of the image file belonging to the reference sheet, each in the device-independent color space, it is possible to prepare an imaging specification, using which the two device-independent image files may be converted into one another. This mapping specification may thus be applied to all further pixels of the image data from the prepress stage converted into a device-independent color space, in order to thus be able to correct all of the pixels of the device-dependent image data provided, which is converted using the standardized color profile.

Furthermore, the mapping specification is taken into consideration in the color profile of the printing press. The mapping specification obtained through the comparison of the two device-independent image files is taken into consideration in the standardized color profile, e.g., the ICC profile, of the printing press in this embodiment of the present invention. The difference from the preceding embodiment is that in this case the device-dependent data from the prepress stage does not have to be changed.

BRIEF DESCRIPTION OF THE DRAWINGS

The present invention is described and explained in greater detail in the following on the basis of multiple figures.

FIG. 2 shows a table having tonal values of a print provided in a color separation, FIG. 3 shows a table having device-independent color values, taking the ICC profile of a printing press into consideration, and FIG. 4 shows the tonal values and color values of the corrected color separation of a print.

DETAILED DESCRIPTION

Figure 1:
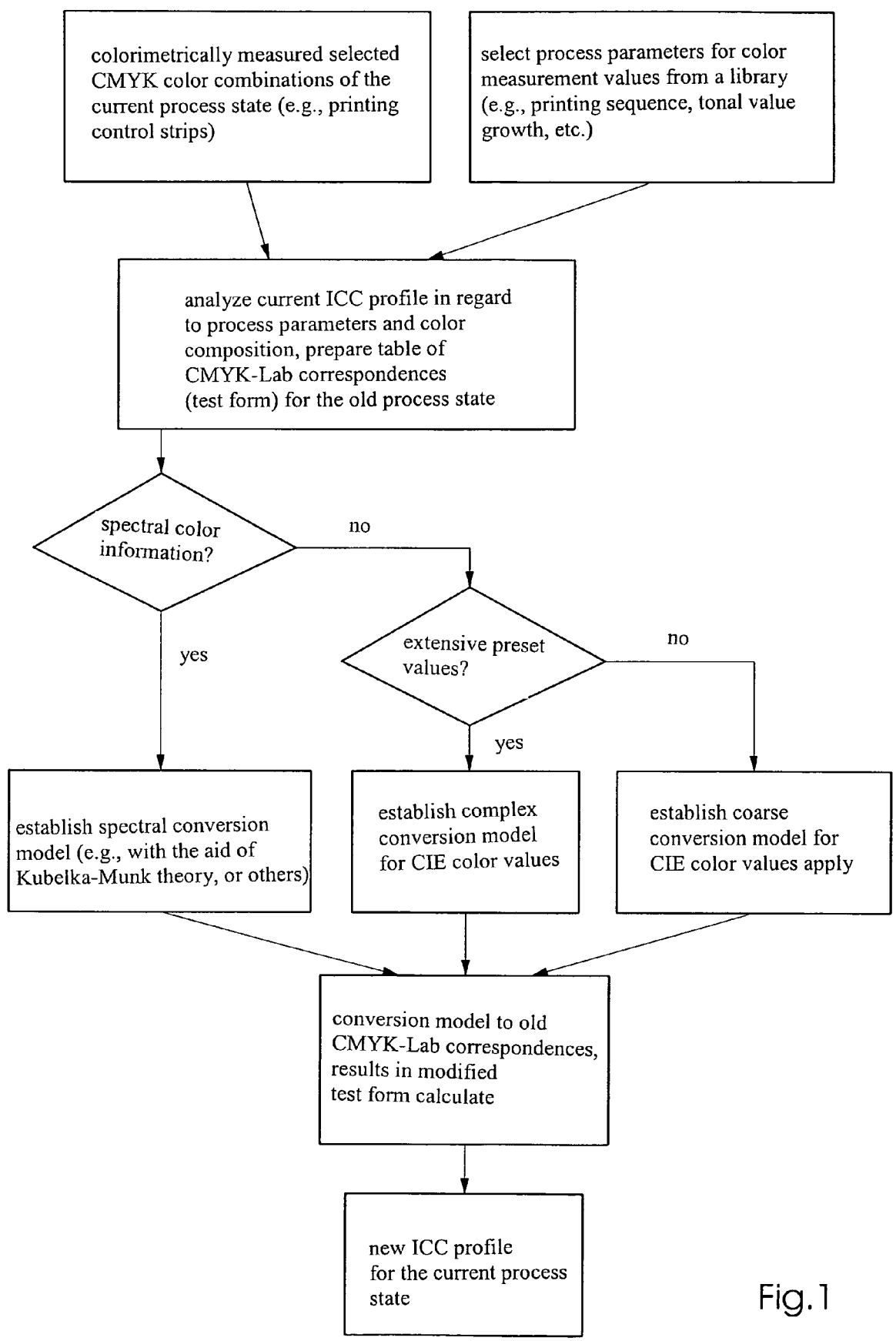
FIG. 1 shows a flowchart for an ICC profile conversion.

To print image data on a printing press, CMYK files are provided by a client together with a reference sheet, which is to be as similar as possible to the sheets to be printed. CMYK is the abbreviation for the English-language names of the printing inks cyan, magenta, yellow, and key, the color black usually being used as key. The reference sheet may originate from an earlier version, for example, or it may be a proof print (test print), which was simulated using a completely different printing process. There is normally no device-independent information in the CMYK image data, such as Lab image data, ICC profiles, or color measurement values of originals. The reference sheet, in contrast, only exists physically, i.e., without any type of device-dependent or device-independent image data. There is an ICC color profile for the printing press which is to print the job, the color profile characterizing the printing process with sufficient accuracy.

During the production of CMYK image data and the reference sheet by the client, there is an array of error sources which, without later correction, result in color errors. Examples of these are:

use of an ICC profile for separation which does not correspond to the printing press, the paper, or the printing inks actually used, use of a proof profile containing errors for the reference sheet, but the client nonetheless wishes for the reference sheet to be emulated, unstable proof process changes on the reference sheet through the effects of light, aging, etc.

All of these possible errors usually go undetected by the printer; nonetheless, their effects are to be compensated for as much as possible. The color structure of the image data of printed images may vary greatly, so that one partial image may be composed with a large amount of black and another completely without black. In general, therefore, multiple corrections are necessary for a specific visually perceived color which is uniquely definable in the standardized Lab color space, because this color may be represented in completely different ways in a non-standardized CMYK color space.

The totality of the necessary corrections may be described by a CMYK link profile, which maps a CMYK color space onto another CMYK color space and/or onto itself. The correction of the unadjusted CMYK image data is then performed by applying the CMYK link profile to this image data.

Sequence of the Method in Individual Steps

Possible method sequences are basically shown in FIG. 1. The methods always start with a whole reference sheet or only a printing control strip being colorimetrically measured. In addition, the method steps and process parameters used for the printing process, such as consumable materials, are known. In the next step below in FIG. 1, CMYK-Lab correspondences are calculated through the ICC profile of the printing press. The way in which this is performed is described in greater detail below. A third step depends on whether there is spectral color information of the reference sheet or of the printing control strip. If there is, the data is taken into consideration using a spectral conversion model, e.g., the Kubelka-Munk theory or similar models. If not, a complex or a rough conversion model for standardized CIE color values is determined as a function of the number of given values. In a fourth step, the conversion model is applied to the old CMYK-Lab correspondences. In addition, in a fifth step, the ICC profile of the printing press may be modified using the conversion model. The way in which such a model is applied is described in greater detail below.

First, a reference sheet is colorimetrically measured at a great number of points in a uniform raster using an automatic spectrophotometer as the measuring device. This reference sheet is provided by the client, since this reference sheet is the print original which is to be emulated in the printing process. The orifice plate of the measuring device must have a specific size in order to capture sufficient light. For this purpose, the orifice plate is normally significantly larger than the raster width of the print used. The measured values always result on the basis of the additive mixture of the reflected light from all points of the sheet section lying precisely under the orifice plate. In this way, the influence of the rasterizing is compensated for through averaging, while colors which do not belong to a color in the CMYK image data may be measured at image spots having very fine details and high contrast, for example, a pattern made of alternating black and white lines may result in a measured value as for a homogeneous gray.

From the CMYK image data provided with the reference sheet, device-independent Lab image data is also produced in "absolute colorimetric" simulation in the Lab color space using the standardized device-independent ICC profile for the printing press. For the image details belonging to the reference sheet, average CMYK values are also calculated from the CMYK image data.

In FIG. 2, the CMYK values for four pixels of the device-dependent image file also provided are shown as examples. The average values of the measuring field corresponding to the four pixels on the associated reference sheet, measured using the Image Control spectrophotometer, are described in the Lab color space by the number triplet (66.5; 2.0; 4.1). Since the reference sheet is to be emulated in the print, this number triplet represents the setpoint value.

The averaged Lab color values (72.4; 3.5; 4.0), which were calculated from the averaged CMYK color values (25; 25; 25; 0) shown in FIG. 2, taking the ICC color profile of the printing press into consideration, are shown in FIG. 3. The further XYZ color values, which are also represented in a device-independent color space as described in the following, correspond to these average Lab color values. The standard color values shown on the far left in the table in FIG. 3 result because a further limiting condition is necessary for a unique conversion from the four-dimensional CMYK color space into the three-dimensional Lab or XYZ color space. In this example, the condition is that the ratio between K (black) and the further printing inks CMY is to be constant during transformations. For all measurements on the reference sheet, the Lab pixels of the associated small image sections are analyzed in the Lab image data of the converted CMYK data. In order to correspond to the additive mixture of the light on the reference sheet, all pixels from the standardized Lab color space must be converted into a further standardized XYZ color space, this conversion being unique since both color spaces are three-dimensional and device-independent. The average values calculated from the pixels of the XYZ color space may in turn be converted uniquely into the Lab color space and are then assigned to the particular measured values from the reference sheet.

In order to avoid errors because of averaging over very inhomogeneous image spots, a statistical analysis is performed in the Lab color space for each image section. If a specific percentage of the pixels, e.g., 20%, has a greater color difference than a fixed tolerance difference, e.g., 20 DeltaE, from the average value, the corresponding measurement is identified as not significant. After the inhomogeneous spots have been sorted out, the possibly arising difference between the average value, calculated in the XYZ color space, of the CMYK pixel transformed in the Lab color space and the Lab pixel from the transformation of the averaged CMYK pixel is disregarded; in other words, the effect of the local curvature of the imaging is disregarded in the averaging.

The set of all significant Lab points from the measurements on the reference sheet is, together with the set of the averaged CMYK points from the image data, the basis for establishing the CMYK link profile, using which the final correction of the CMYK image data is performed.

The following describes in detail how a new, corrected CMYK point is established for the individual CMYK points from the given set with the aid of the associated Lab measuring point from the reference sheet and the ICC profile of the printing press. The original CMYK point is identified in this case with $CMYK_1$ and the corrected CMYK point with $CMYK_2$.

If a point $CMYK_1$ is converted "absolute colorimetrically" into the Lab color space using the ICC printing press profile, a point that is different from the Lab point measured on the reference sheet may result because of the error sources described above, among other things. In order to compensate for this difference, a shift of the point $CMYK_1$ to another location $CMYK_2$ is necessary. In order to be able to produce a unique relationship between the two sides of the profile (CMYK and Lab), an additional restrictive condition is necessary on the four-dimensional side (CMYK). In the method described here, it is stipulated that the ratio K/(C+ M+Y) is to be the same for $CMYK_1$ and $CMYK_2$. This means that the black structure is not significantly changed after the correction. Therefore, if the point $CMYK_2$ is searched for in the surroundings of $CMYK_1$ (25; 25; 25; 0), only a three-dimensional point set must be observed for this purpose. By varying the values C, M, and Y, and fixing K in accordance with the recent ratio, a three-dimensional "cloud" of points may be produced around the point $CMYK_1$. In this case, the values C, M, Y, K must be restricted to the range 0 . . . 100%. This point cloud is transformed into the Lab color space using the ICC profile of the printing press, and the point which has the smallest color difference to the point sought (measurement on the reference sheet) is selected. Depending on the dimensions of the point cloud or the number of its points, it may be expedient to repeat this procedure multiple times. The nearest point overall then represents the point $CMYK_2$. Such a nearest point (64.5; 4.3; 4.4) in the Lab color space is shown in FIG. 4, since this point is the one closest to the setpoint value (66.5; 2.0; 4.1) of all points of the point cloud. Taking the ICC profile into consideration, this results in corrected average CMYK values (35; 35; 35; 0). Therefore, all four CMYK values of the associated measuring field are now corrected using addition of the result from the differential formation of $CMYK_2$-$CMYK_1$. Therefore, correction is terminated for a small number of pixels, as in this example.

In many cases, $CMYK_1$ is already at the limit of the color body, e.g., the point (50, 50, 0, 0). If the Lab color sought is not contained in the color body of the printing process, e.g., because it is even more multicolored than that belonging to $CMYK_1$, the method provides a point $CMYK_2$ which also lies on the limit and possibly somewhat closer to the target than the original point. However, complete correction of the color deviations is not guaranteed in all cases.

When a corresponding point $CMYK_2$ has been found for all $CMYK_1$ points, the CMYK link profile must still be generated from this set of point pairs, since in practice there are not only four pixels, but rather thousands or millions.

An important component of a CMYK link profile is a table in which, for uniformly graduated combinations of $C_1$, $M_1$, $Y_1$, and $K_1$ between 0 and 100%, the resulting values $C_2$, $M_2$, $Y_2$, and $K_2$ are listed. The values for points between the interpolation points of this four-dimensional lattice result through interpolation from the values of the neighboring interpolation points. Therefore, from the current set of CMYK point pairs, a set corresponding thereto may be determined, in which the points $CMYK_1$ are the lattice points of the CMYK link profile.

The way in which a shifted result point may be calculated for each of the CMYK lattice points will now be described. In general, no point having the desired input CMYK values will be found in the set of the previously established point pairs. Therefore, all point pairs will contribute to the result in accordance with their distance, i.e., the distal with a low influence and the proximate with a high influence. In this case, the Euclidean distance in the four-dimensional CMYK color space $$d=sqrt((C_1-C_2)^2+(M_1-M_2)^2+(Y_1-Y_2)^2+(K_1-K_2)^2)$$

is used as the distance scale, sqrt indicating square root. Therefore, points lying close to the actual lattice point have a large influence and those lying far away have no influence if one defines a weight $g=1/d^2$ in relation to the first point of each point pair. For the current shift to be established, all weights are also each divided by the sum of all weights in order to achieve normalization. The shift on the current lattice point then results by multiplying the shift of all previously established point pairs in CMYK with their normalized weight factors and summing up all of these values. This shift is then added to the actual CMYK values and the values are limited to the range between 0 and 100% in the special case in which d=0 somewhere, no weight may be determined and the shift is to be determined solely by this point pair.

This method is applicable even in the hypothetical case in which only one single color occurs in the entire sheet. Typically, many shifts have an influence on the shift at a lattice point of the link profile. Conflicting influences because of proximate shifts in completely different directions hardly have an effect at even a slight distance.

What is claimed is:

1. A method for correcting digitized image data in the prepress stage when using printing presses having a device-independent color profile in the main printing stage, the method comprising the steps of:
    measuring colorimetrically a reference sheet and producing a first image file in a device-independent color space;
    converting a second image file associated with the reference sheet in a device-dependent color space into a third image file in a device-independent color space using a device-independent color profile belonging to the printing press to be used;
    comparing the first and third image files; and
    performing alterations on the second image file associated with the reference sheet or alterating a printing process in the printing press to be used if tolerance limits are exceeded.

2. The method as recited in claim 1 wherein consumable materials used in the printing press selected are changed to alter the printing process.

3. The method as recited in claim 2 wherein the materials include paper or ink.

4. The method as recited in claim 1 wherein the device-independent color profile of the printing press is an ICC profile.

5. The method as recited in claim 1 wherein measuring step includes colorimetrically measuring the reference sheet at multiple points in a uniform raster using an automatic spectrophotometer.

6. The method as recited in claim 1 wherein one of the first device-independent image files exists in a Lab image file format.

7. The method as recited in claim 6 wherein multiple pixels of the reference sheet are combined into a measured value during the colorimetric measurement and this measured value is compared to the likewise combined values of the third device-independent image file.

8. The method as recited in claim 1 further comprising sorting out measured values obtained using the colorimetric measurement and having a color difference with respect to an average value formed from the surrounding measured values exceeding a fixed limit.

9. The method as recited in claim 1 wherein, if the tolerance limits are exceeded, correction values are calculated and a mapping specification for converting the first and third image files into one another is calculated therefrom.

10. The method as recited in claim 9 wherein the mapping specification is taken into consideration in the color profile of the printing press.

11. A device for performing the method as recited in claim 1.

* * * * *

UNITED STATES PATENT AND TRADEMARK OFFICE
CERTIFICATE OF CORRECTION

PATENT NO. : 7,307,755 B2  Page 1 of 1
APPLICATION NO. : 10/752269
DATED : December 11, 2007
INVENTOR(S) : Ulf Delang et al.

It is certified that error appears in the above-identified patent and that said Letters Patent is hereby corrected as shown below:

Column 8, line 7 equation should read:

--$d = \text{sqrt}((C_1-C_2)^2 + (M_1-M_2)^2 + (Y_1-Y_2)^2 + (K_1-K_2)^2)$-- note the parenthesis around $K_1-K_2$ instead of

"$d = \text{sqrt}((C_1-C_2)^2 + (M_1-M_2)^2 + (Y_1-Y_2)^2 + K_1-K_2)^2)$"

Signed and Sealed this

Sixth Day of May, 2008

JON W. DUDAS
*Director of the United States Patent and Trademark Office*